June 23, 1959 — C. B. ROSENBERG — 2,891,646
HOPPER FOR DELIVERING ROUND ARTICLES
Filed June 7, 1954 — 2 Sheets-Sheet 1
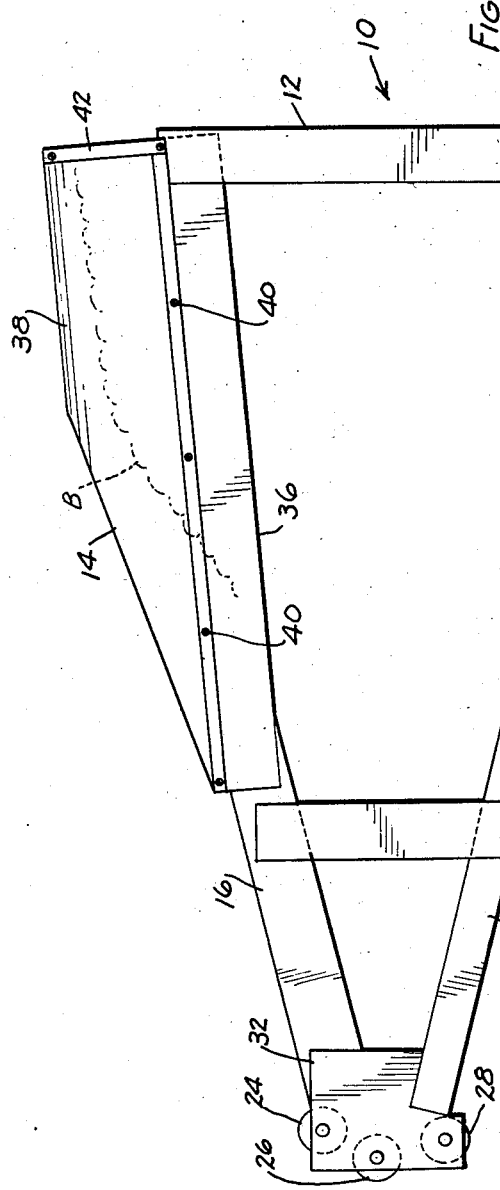
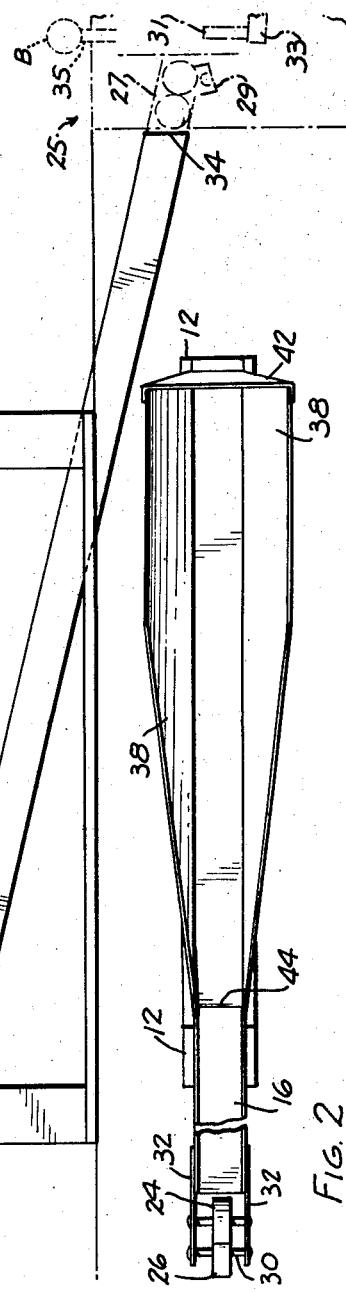
INVENTOR.
CHARLES B. ROSENBERG
BY
Barnes, Kisselle, Laughlin & Raisch
ATTORNEYS.

June 23, 1959 C. B. ROSENBERG 2,891,646
HOPPER FOR DELIVERING ROUND ARTICLES
Filed June 7, 1954 2 Sheets-Sheet 2

INVENTOR.
CHARLES B. ROSENBERG
BY
Barnes, Kisselle, Laughlin & Raisch
ATTORNEYS.

United States Patent Office 2,891,646
Patented June 23, 1959

2,891,646

HOPPER FOR DELIVERING ROUND ARTICLES

Charles B. Rosenberg, Oak Park, Mich., assignor to Q-Tee Incorporated, Detroit, Mich., a corporation of Michigan Application June 7, 1954, Serial No. 434,765

5 Claims. (Cl. 193—39)

This invention relates to a hopper for receiving articles in massed relation and delivering them one at a time to a point remote from the hopper body.

The invention has myriad applications in manufacturing, vending and similar operations where it is desired to convey round articles from a relatively large container and to deliver the articles singly at a delivery point. The hopper is especially well adapted for use where the articles to be conveyed may roll gravitationally in a conduit from the hopper body to the delivery point. In such a system, the surfaces of adjacent rolling articles are in frictional engagement which tends to prevent the rolling or rotating motion of the articles. One result is that the articles tend to jam up in bends in the conduit, causing a stoppage of the flow therethrough. Another result is that articles in massed or tiered relation in the hopper body tend to remain interlocked in static condition in the hopper body.

It is an object of this invention to provide a simple, inexpensive hopper construction wherein tiered, round articles in the hopper body will flow one at a time into a conduit and wherein the articles in the conduit will flow freely around curves therein. The invention generally contemplates the use of a stepped construction in the conduit for reducing the tiered relation of the articles therein and the use of rotatable elements properly located at the bends in the conduit to provide an anti-friction surface for contact with the articles.

The invention is exemplified herein by a hopper for delivering golf balls from a hopper body to an automatic ball teeing device, such as might be used at a golf driving range. One form of the invention is shown in the accompanying drawings:

Fig. 1 is a partially diagrammatic side elevation of a hopper according to this invention with a portion of a ball teeing device shown in phantom.

Fig. 2 is a plan view of the hopper.

Figure 3:
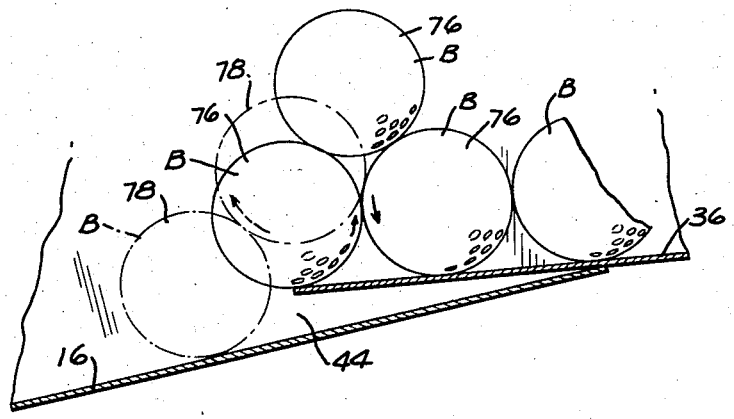
Fig. 3 is an enlarged diagrammatic view illustrating the stepped construction of the conduit and the functioning thereof.

The hopper 10 shown in the drawings has a frame 12 supporting a hopper body 14 and supporting inclined, oppositely angled channels 16 and 18. The channels may lie generally in the same vertical plane and the upper end 20 of the lower channel 18 lies generally beneath but somewhat outwardly of the lower end 22 of upper channel 16. Rotatable elements 24, 26 and 28 are mounted adjacent the ends 20 and 22 of the channels by such means as shafts 30 supported by plates 32 secured to the channels. The channels and rollers cooperate to form a continuous conduit from hopper body 14 to a delivery point at the lower end 34 of channel 18. An automatic teeing device 25 is shown in phantom adjacent end 34 of the conduit. This device may include a receiver 27, an escapement 29 for releasing individual balls B to a tee 31 and an arm 33 for elevating the teed ball above ground level as at 35.

Hopper body 14 has a sloping channel portion 36 in its base and has flared outside members 38 secured to the channel portion by such means as screws 40. The hopper body has a closure element or head 42 at its upper end. The flared side elements 38 may have a taper conformation as shown. Channel portion 36 of the hopper body may comprise an extension of upper channel 16. The elongate channel thus provided has at least one step 44 therein. This step is preferably at the juncture of channel 16 and channel portion 36 of the hopper body and may be formed by projecting channel portion 36 over channel 16. The slope of upper cannel 16 is preferably somewhat greater than the slope of channel portion 36. The conduit, from head 42 to delivery point 34, is slightly wider and deeper than the diameter of a ball B so that balls may roll freely therein in single file.

Rollers 24, 26 and 28 may conveniently comprise ordinary, commercially available roller skate wheels. These wheels or rollers are arranged to rotate on axes 46, 48 and 50 extending transversely of the channels 16 and 18 and in the specific form of the invention shown in the axes are substantially horizontal. The rollers are positioned so that their inward portions 52, 54 and 56 provide contacts for balls flowing from the hopper body to the delivery point 34. The rollers are positioned closely together relative to the size of the balls B and their axes of rotation are positioned such that the rollers provide an anti-friction surface passing the balls freely around the bend in the conduit. The number and size of the rollers may be varied to suit individual use and operating conditions.

Figure 4:
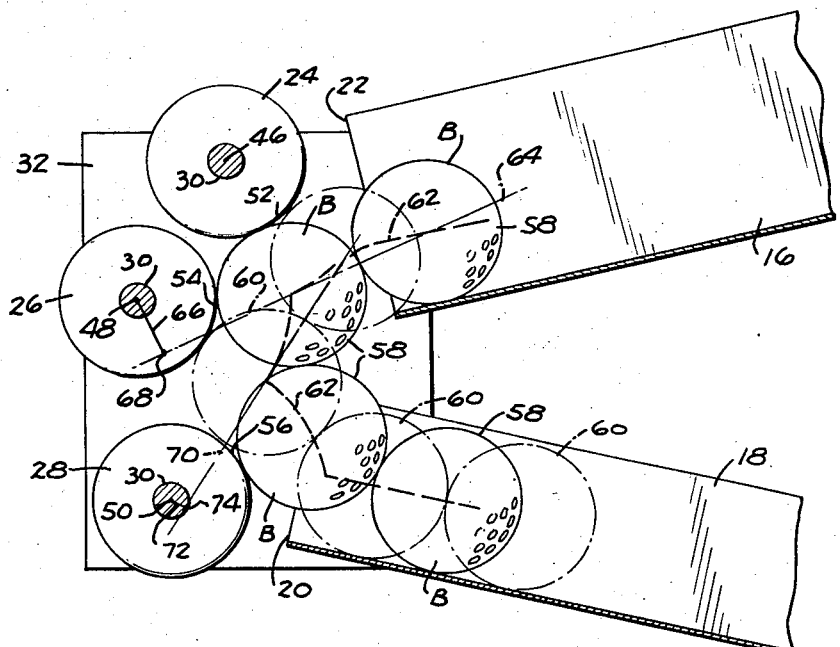
Fig. 4 is an enlarged diagrammatic view illustrating the construction of the conduit at a bend and the functioning thereof.

Operation of rollers 24, 26 and 28 is illustrated in Fig. 4. Golf balls B passing through the bend in the conduit are represented in solid lines 58 in one position and the same balls are represented in dotted lines 60 in a subsequent position. The path followed by the centers of the balls in passing the rollers is represented by broken line 62. Assuming that the balls are in the solid line position 58, some of the balls are in contact with each of the three rollers 24, 26 and 28. Each roller is positioned such that the center line between any ball contacting it and a contiguous upstream ball perpendicularly intersects a radius of such roller at a point which lies in a downstream direction from the axis of rotation of the roller. Accordingly, center line 64 between the two upper balls 58 (Fig. 4) perpendicularly intersects radius 66 of roller 26 at point 68. Point 68 lies downstream of axis 48 with reference to the direction of flow of the balls. When the balls have shifted to the position indicated at 60, the center line 70 between the balls perpendicularly intersects radius 72 of roller 28 at point 74 which lies downstream of axis 50.

It is to be noted that whatever position the balls assume when in contact with the rollers, the force of the ball on the roller produces a moment tending to rotate the roller in a direction for passing the ball downstream. Also, no matter what position the balls assume relatively to each other in the vicinity of the rollers, they cannot become jammed in locked relation because each of the rollers will pass each ball contacting it. The rollers thus provide an anti-friction surface in the bend in the conduit which insures a free flow of the balls toward the delivery point 34.

Operation of the stepped construction of the conduit is illustrated in Fig. 3. It may be assumed that balls B flowing from the hopper body in channel portion 36 have reached the vicinity of the step 44 in two tiered relation as illustrated in solid lines 76. The two lower balls tend to rotate in the direction indicated by arrows so that their surfaces interengage frictionally and the upper ball engages both of the lower balls frictionally, thereby retarding the flow of balls in the conduit. When the leading ball falls over step 44, it disengages from the trailing ball and the balls assume a position such as illustrated in dotted lines 78. The upper ball tends to rotate in the direction indicated by the arrow and impels the leading ball down channel 16. The upper ball then falls into the space thus provided, thereby completely reducing the tiered relation of the balls. The increased slope of channel 16 over the slope of channel portion 36 increases the velocity of flow in the vicinity of the step and thereby further facilitates final reduction of the tiered relation of the balls.

In use, a bucket load of golf balls B is poured or dumped into hopper body 14 preferably against the head 42. The balls are then momentarily in stacked or tiered relation at the upper end of the hopper body. The balls at the lower end of the mass begin to roll downwardly, thereby initiating reduction of the tiered formation of the balls. By the time the balls reach step 44 they are in probability flowing as single balls or in the two tiered formation illustrated at 76 in Fig. 3. Final reduction of the tiered formation occurs at the step 44 as described. The balls then flow singly through upper channel 16, around the bend provided by rollers 24, 26 and 28 and through channel 18 to the delivery point 34. Balls may fill the entire conduit from delivery point 34 back to hopper body 14. In this case the balls will advance through the system in progressive steps as individual balls are released by escapement 29 in the automatic tee 25. When balls are thus backed up in the system, balls both upstream and downstream of the rollers exert a force on the lowest ball in the manner of a fluid head because of the anti-friction nature of the surfaces at the bend provided by the rollers.

Successful operation of this hopper has been obtained where the hopper is proportioned such that all of the balls in one load are contained in approximately two-thirds of the distance from head 42 to step 44, leaving about one-third of the length of channel portion 36 free. When the hopper body is thus proportioned, the balls have usually been reduced at least to a two tiered relation by the time they reach step 44. Step 44 may be about one half inch high. With different types of articles these proportions may vary; however, the principle remains the same. Successful operation has also been obtained where channel portion 36 slopes at a 5° angle to the horizontal and the upper and lower channels 16 and 18 slope at a 13° angle to the horizontal. These angles may also be varied to suit individual operating conditions.

I claim:

1. A hopper comprising, a frame, a hopper body on said frame, a conduit, said conduit being positioned to convey articles from said hopper to a delivery point, means forming a bend in said conduit, a plurality of rotatable elements forming the outer wall of said bend, the inward portions of said elements forming contacts for articles passing through said bend, said elements being arranged to rotate on axes generally perpendicular to the plane of said bend, said inward portions being closely disposed relative to the size of articles which said conduit is adapted to conduct, said elements being so arranged that the axis of each lies in an upstream direction from the intersection between a radius thereof and the center line between any article contacting said inward portion thereof and any article contiguous to and upstream of the first mentioned article, so that the force exerted by an article on any of said inward portions under the influence of articles upstream thereof produces a moment operative to turn the element contacted in a direction for passing the article downstream.

2. Conduit structure comprising, means forming a container adapted to contain spherical articles in tiered relation, channel means, said container having an outlet disposed generally in the direction of said channel means and arranged to pass articles in tiered relation to said channel means, said channel means extending from said outlet to a delivery point, means forming a generally vertical bend in said channel means, said channel means being inclined between said outlet and said bend so that articles will roll therein and initiate reduction of their tiered relation, step means in said channel means, said step means being disposed at a region where the articles are in a probable two-tiered relation, whereby to complete reduction of the tiered relation while said articles are moving in said channel means and before they reach said bend, the portion of said channel means downstream of said step means having a slope greater than the slope of the channel means upstream thereof, whereby to accelerate final reduction of such tiered relation, a plurality of rotatable elements forming the outer wall of said bend, the inward portions of said elements forming contacts for articles passing through said bend, said elements being arranged to rotate on generally horizontal axes, said elements being so arranged that the force exerted on any of said inward portions by any article under the influence of another article upstream thereof produces a moment for turning said element in a direction for passing the article in contact therewith in a downstream direction.

3. The hopper device defined in claim 2 wherein said channel means and body are adapted for handling golf balls and wherein there are at least three of said rotatable elements at said bend.

4. Conduit structure comprising, a first conduit portion adapted to conduct rolling round articles therein, a second conduit portion adapted to conduct rolling round articles therein, said conduit structure being discontinuous between said first and second conduit portions, said first and second conduit portions extending in different directions, a plurality of rotatable elements mounted to provide a bend in said conduit structure between said first and second conduit portions, the inward portions of said elements forming contacts for articles passing through said bend, said elements being arranged to rotate on axes generally perpendicular to the plane of said bend, said inward portions being closely disposed relative to the size of articles which said conduit is adapted to conduct, said elements being so arranged that the axis of each lies in an upstream direction from the intersection between a radius thereof and the center line between any article contacting said inward portion thereof and any article contiguous to and upstream of the first mentioned article so that force exerted by an article on any of said inward portions under the influence of articles upstream thereof produces a moment tending to turn the element contacted in a direction for passing the article downstream.

5. Conduit structure comprising, a first conduit portion and a second conduit portion, each conduit portion being adapted to conduct rolling round articles therein, said conduit structure being discontinuous between said first and second conduit portions, said conduit portions extending in different directions, and diverting means operative to divert articles rolling out of said first conduit portion into said second conduit portion, said diverting means including a plurality of elements mounted to rotate about axes which are disposed at predetermined locations relative to said first and second conduit portions, said elements having diameters predetermined so that their peripheries are spaced apart by distances which are smaller than the diameters of articles which said conduit structure is adapted to conduct, and so that said peripheries provide a series of contacts arranged in a predetermined path between said conduit portions, said first conduit portion and said elements being so disposed relative to each other that any article discharging from said first conduit portion and engaging any of said contacts while in engagement with an upstream article is impelled along a line passing downstream of the axis of rotation of the engaged element so that a moment of force is produced tending to turn the element engaged in a direction for passing said article downstream, whereby to divert a train of articles generally along said path from said first to said second conduit portion freely without jamming in said diverting means.

References Cited in the file of this patent

UNITED STATES PATENTS

| | | |
|---|---|---|
| 1,240,321 | Dickenson | Sept. 18, 1917 |
| 2,376,960 | Clem | May 29, 1945 |
| 2,385,141 | Kuehlman | Sept. 18, 1945 |
| 2,417,878 | Luzietti | Mar. 25, 1947 |
| 2,479,878 | Strelzoff | Aug. 23, 1949 |
| 2,581,363 | Creedon | Jan. 8, 1952 |
| 2,778,498 | Vincent | Jan. 22, 1957 |